United States Patent [19]
Fukinuki

[11] Patent Number: 5,421,228
[45] Date of Patent: Jun. 6, 1995

[54] DESK-TOP SLIDE TYPE CIRCULAR POWER SAW

[75] Inventor: Masatoshi Fukinuki, Hiroshima, Japan

[73] Assignee: Ryobi Limited, Hiroshima, Japan

[21] Appl. No.: 69,364

[22] Filed: Jun. 1, 1993

Related U.S. Application Data

[63] Continuation of Ser. No. 717,407, Jun. 17, 1991, abandoned.

[30] Foreign Application Priority Data

Jun. 29, 1990 [JP] Japan .................................. 2-69227

[51] Int. Cl.⁶ ......................... B23D 45/04; B27B 5/20
[52] U.S. Cl. ...................................... 83/471.3; 83/473; 83/486.1; 83/490; 83/581
[58] Field of Search ............... 83/471.3, 473, 486, 83/486.1, 488, 489, 477.1, 490, 478, 467.1, 581

[56] References Cited

U.S. PATENT DOCUMENTS

| | | | |
|---|---|---|---|
| 1,836,457 | 12/1931 | Emmons | 83/471.3 |
| 2,718,907 | 9/1955 | Fjalstad | 83/581 X |
| 3,202,669 | 2/1967 | Edler | 83/471.3 |
| 4,163,404 | 8/1979 | Lavis | 83/471.3 X |
| 4,537,105 | 8/1985 | Bergler | 83/471.3 |
| 4,581,966 | 4/1986 | Kaiser et al. | 83/478 X |
| 4,587,875 | 5/1986 | Deley | 83/471.3 |
| 4,869,142 | 9/1989 | Sato et al. | 83/471.3 X |
| 4,934,233 | 6/1990 | Brundage et al. | 83/471.3 X |
| 5,054,352 | 10/1991 | Fushiya et al. | 83/471.3 X |
| 5,060,548 | 10/1991 | Sato et al. | 83/471.3 |

FOREIGN PATENT DOCUMENTS

62-11526  1/1987  Japan .

*Primary Examiner*—Richard K. Seidel
*Assistant Examiner*—Clark F. Dexter
*Attorney, Agent, or Firm*—Oliff & Berridge

[57] ABSTRACT

A desk-top slide type circular power saw has a cutter device which is capable of performing a slant cutting and movable back and forth. The saw includes a base, a turntable rotatably mounted on the base, a pair of bearings formed in the turntable, a pair of thrust shafts supported by the bearings to be movable back and forth in an axial direction, a first holder mounted on one end of the thrust bearings, the first holder having a first engagement portion in the form of an arcuate shape, a second holder provided with a second engagement portion engageable with the first engagement portion to be slidable relative to the first engagement portion, and a coupling member for coupling the first and second holders with each other. The cutter device is mounted on the second holder to be swingable.

13 Claims, 8 Drawing Sheets

DESK-TOP SLIDE TYPE CIRCULAR POWER SAW

This is a continuation application Ser. No. 07/717,407, filed Jun. 17, 1991, now abandoned.

BACKGROUND OF THE INVENTION

The present invention relates to a desk-top slide type circular power saw, and more particularly to a desk-top slide type circular power saw which is capable of performing a slant cutting, and in which a cutter means, slides back and forth.

In general, a desk-top circular power saw is well known in which a slant cutting is possible and a cutter means is movable back and forth.

Figure 11:
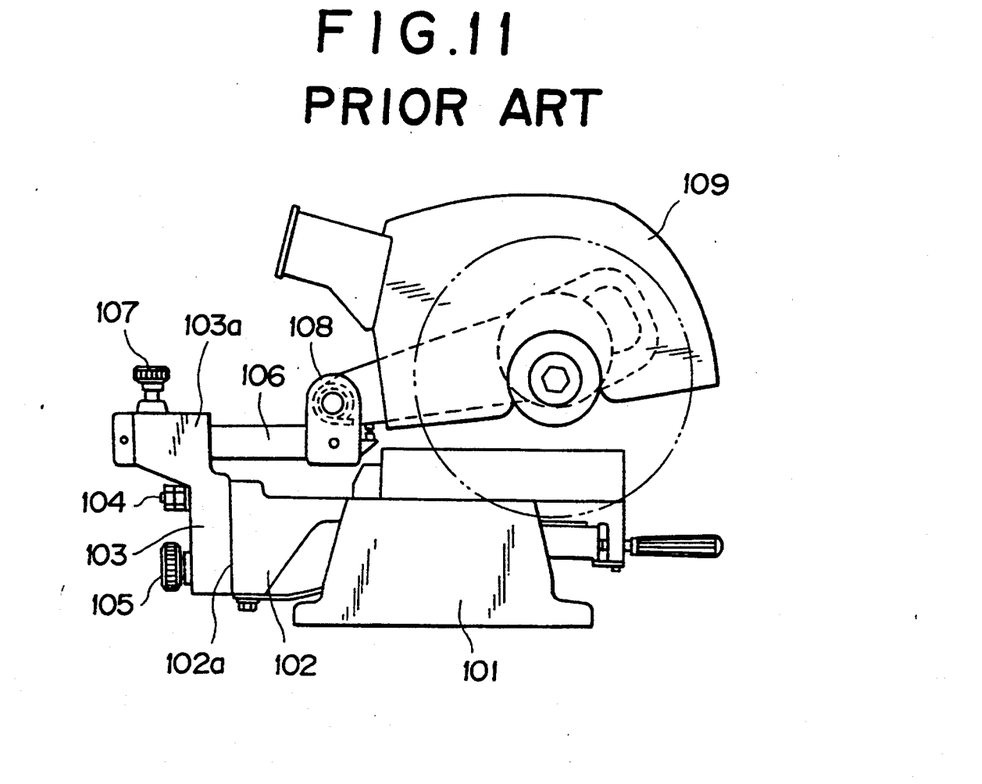
FIG. 11 is a side elevational view showing a conventional desk-top slide type circular power saw.

FIG. 11 is a side elevational view showing a desk-top slide type circular power saw disclosed in Japanese Utility Model Unexamined Publication No. 62-162001. A turntable 102 is rotatably mounted on a base 101. A holder 103 is rotatably mounted through a shaft 104 on a rear face 102a of the turntable 102. The rotation of the holder 103 is adjusted by a slant adjust knob 105. On the other hand, a bearing portion 103a is formed in an upper portion of the holder 103. A slide shaft 106 is supported slidably in the axial direction to the bearing portion 103a. The back and forth movement of the slide shaft 106 is adjusted by a back-and-forth adjust knob 107. A cutter means 109 is swingably mounted through a hinge 108 at an end portion of the slide shaft 106.

In order to obliquely position the cutter means 109 of the slide type circular power saw with such an arrangement, the slant adjust knob 105 is loosened, and the holder 103 is rotated about the shaft 104. Also, in order to move the cutter means 109 back and forth, the back-and-forth adjust knob 107 is loosened and the slide shaft 106 is moved back and forth.

However, since the slant adjust knob 105 for the slant or oblique adjustment is provided on the holder 103 located at the rear face of the turntable 102, in the case where the cutter means 109 is held in the advanced position (shown in FIG. 11), the slant adjust knob 105 is located far from the operator. Thus, the conventional circular power saw suffers from the problem that it is difficult to perform the adjusting work to reduce the working efficiency. In addition, the saw is weak in mechanical strength because the turntable 102 is discrete from the holder 103 having the bearing portion 103a.

SUMMARY OF THE INVENTION

In view of the foregoing problems inherent in the prior art saw, an object of the present invention is to provide a desk-top slide type circular power saw in which it is easy to slant the cutter means, and which has a reliability in an aspect of mechanical strength.

According to the present invention, in order to meet the above-noted and other objects, there is provided a desk-top slide type circular power saw having a circular saw blade, comprising: a cutter device capable of performing a slant cutting and movable back and forth; a base; a turntable rotatably mounted on the base; a bearing formed in the turntable; a thrust shaft supported by the bearing to be movable back and forth in an axial direction; a first holder mounted on one end of the thrust shaft, the first holder having a first engagement portion in the form of an arcuate shape having a center on a line along a circular saw blade when it takes a position perpendicular to the turn table; a second holder provided with a second engagement portion engageable with the first engagement portion to be slidable relative to the first engagement portion, the cutter device being mounted on the second holder to be swingable, and a coupling member for coupling the first and second holders with each other.

In order to perform the oblique cutting, i.e., in order to hold the cutter device in a slant manner, a fastening member is first loosened, so that the first and second holders are loosely coupled with each other. Under such a condition, the second engagement portion of the second holder is slidingly moved on the first engagement portion which is arcuate and is formed in the first holder, and the second holder is rotated together with the cutter device. At a desired position, the fastening means is tightened, so that the second holder is fixed to the first holder. As a result, the setting is finished. At this time, since the first holder is provided at the ends of the thrust shafts, the first holder is moved back and forth together with the thrust shafts. Accordingly, the fastening member is moved together, to thereby readily perform the slant work. In addition, since the bearing portions are formed in unison with the turntable, it is possible to ensure the reliablity of the mechanical strength.

DESCRIPTION OF THE PREFERRED EMBODIMENTS

The first embodiment of the present invention will now be described with reference to FIGS. 1 to 4.

Figure 1:
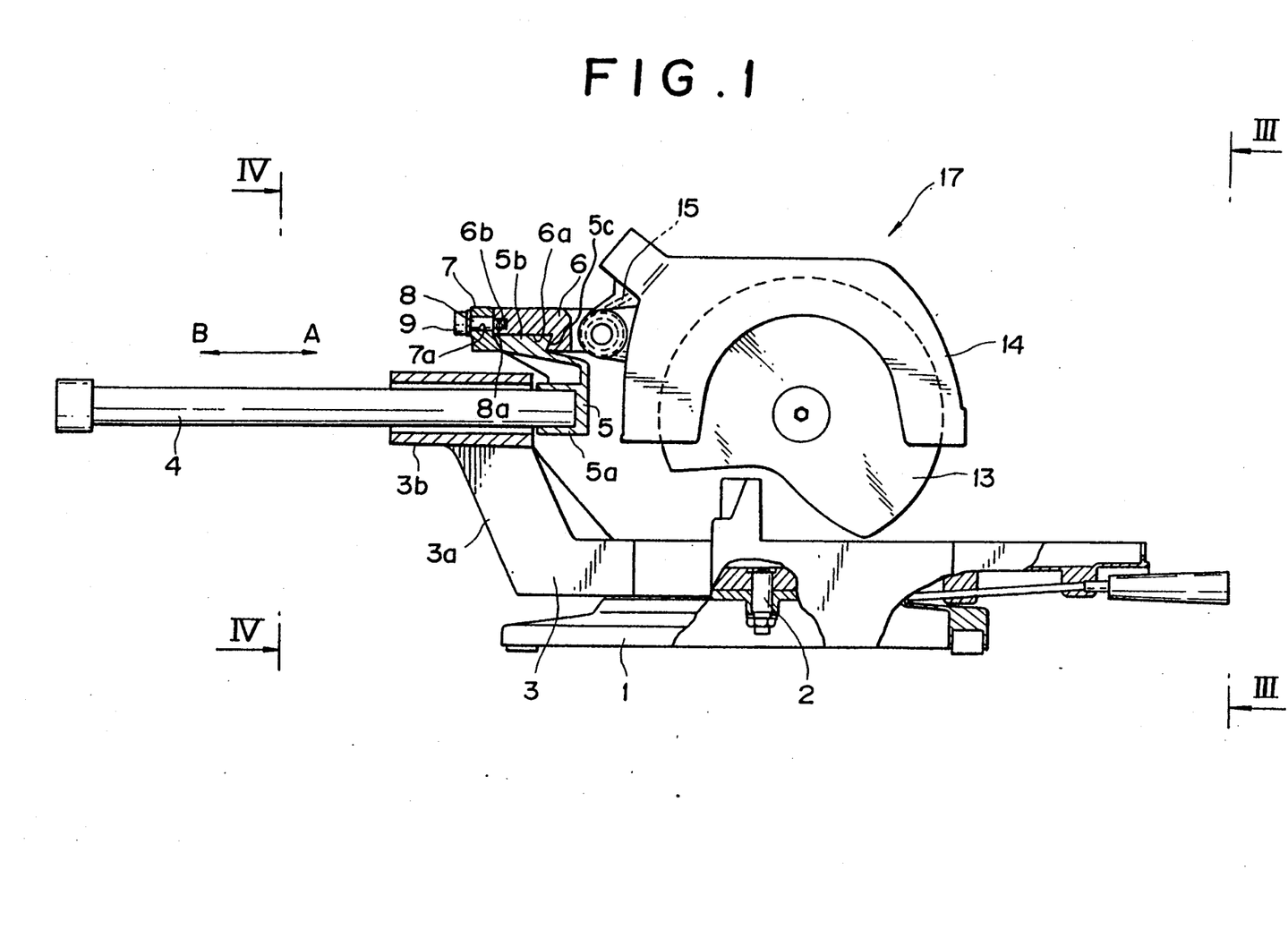
FIG. 1 is a side elevational view showing a desk-top slide type circular power saw according to the present invention.
Figure 2:
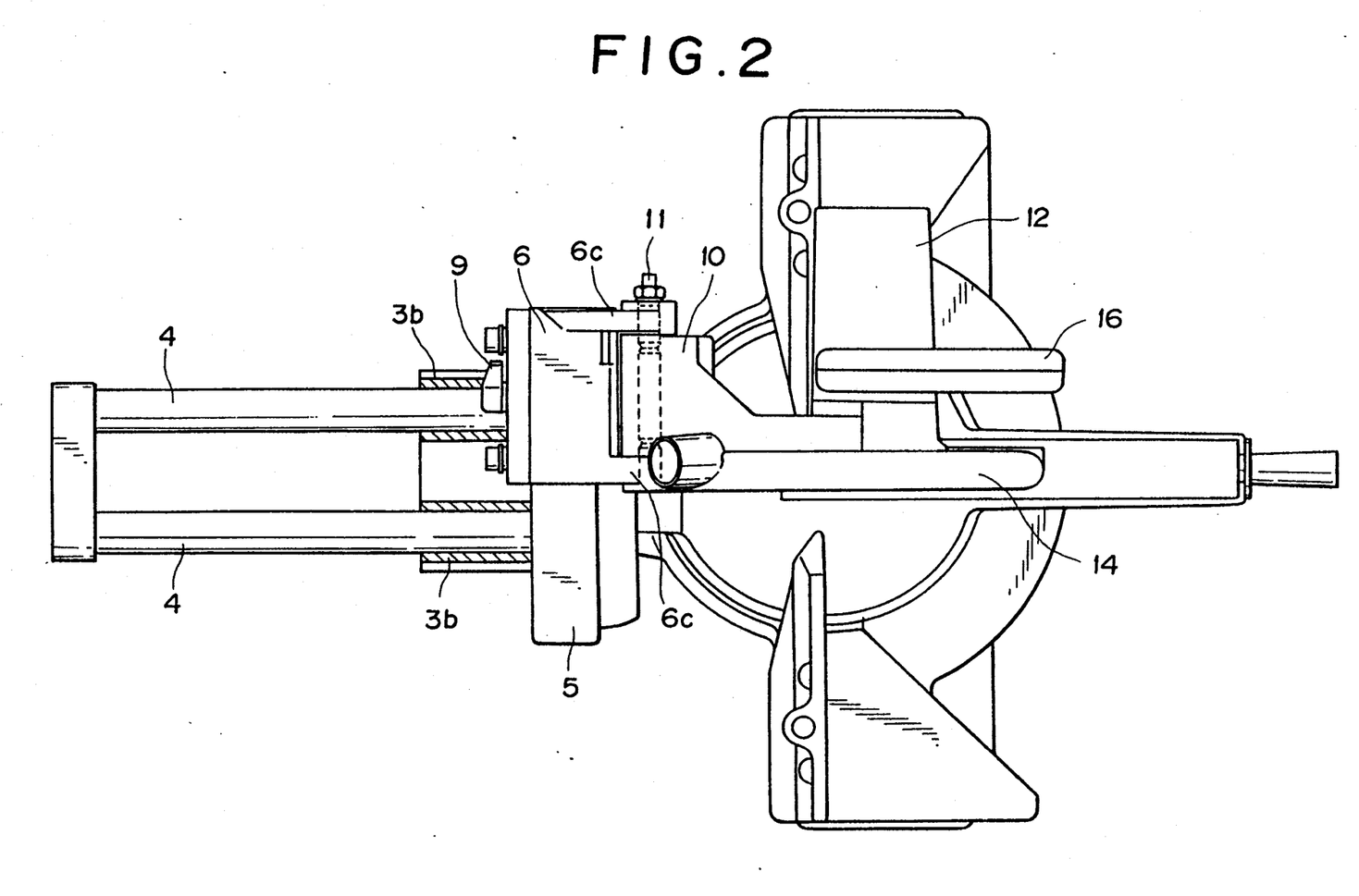
FIG. 2 is a top plan view showing the circular power saw shown in FIG. 1.

FIG. 1 is a side elevational view showing a desk-top slide circular power saw, and FIG. 2 is a top plan view thereof. A turntable 3 is rotatably mounted through a rotary shaft 2 on a top portion on a base 1. An arm 3a extends obliquely upwardly on one side of the turntable 3 with a pair of bearings 3b at an upper end of the arm 3a (see FIG. 2). A pair of thrust shafts 4 are mounted on the bearings 3b for an axially sliding movement. A pair of engagement portions 5a of a first holder 5 are engaged with ends of the two thrust shaft 4 on the side of the base 1. A convex portion 5b having an inverted trapezoidal shape in cross section is formed at an upper end portion of the first holder 5 for preventing a pulling-apart. The convex portion 5b takes an arcuate shape having a center on a line along the saw blade 13 when it takes a position perpendicular to the turn table 3. A concave portion 6a engageable with a top surface and a side slanted wall 5c, on the base side, of convex portion 5b is formed in a second holder 6 which is slidably mounted in the circumferential direction with respect to the first holder 5. A retainer block 7 is provided on the other slant side, on the side of the thrust shaft 4 of the convex portion 5b of the first holder 5. Further, the retainer block 7 is also in contact with the second holder 6. A hole 7a is also formed in the retainer block 7. A lever shaft 8 is inserted into the hole 7a. A screw portion 8a is formed at a tip end portion of the lever shaft 8 and is threadedly engaged with a screw hole 6b of the second holder 6. A lever 9 is provided at a rear end of the lever shaft 8. Furthermore, FIG. 2 shows a pair of projections 6c formed at an interval on the side of the base 1 of the second holder 6. An end portion of a gear case 10 is received between the gap between the projections 6c. The gear case 10 is rotatably supported by a shaft 11. The gear case 10 is connected to the circular saw blade 13 through a motor housing 12. Furthermore, a safety cover 14 is provided at the motor housing 12 for covering the circular saw blade 13. A coil spring 15 is wound around the shaft 11 to thereby bias the gear case 10 and to limit the circular saw blade 13 to an upper position. Reference numeral 16 denotes a handle.

Figure 3:
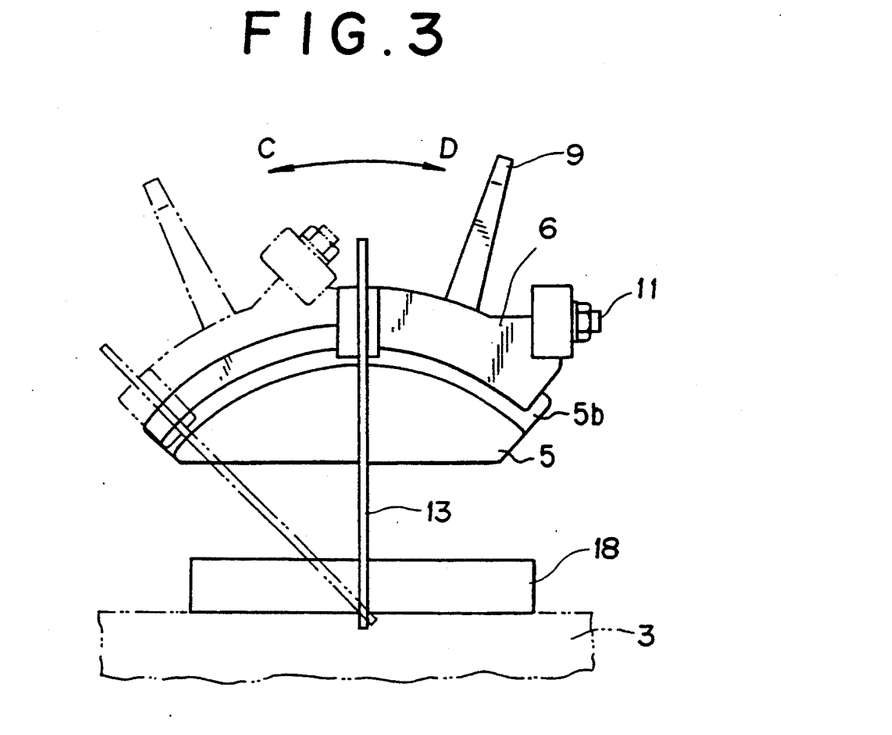
FIG. 3 is a front view as viewed in the direction III—III of FIG. 1.
Figure 4:
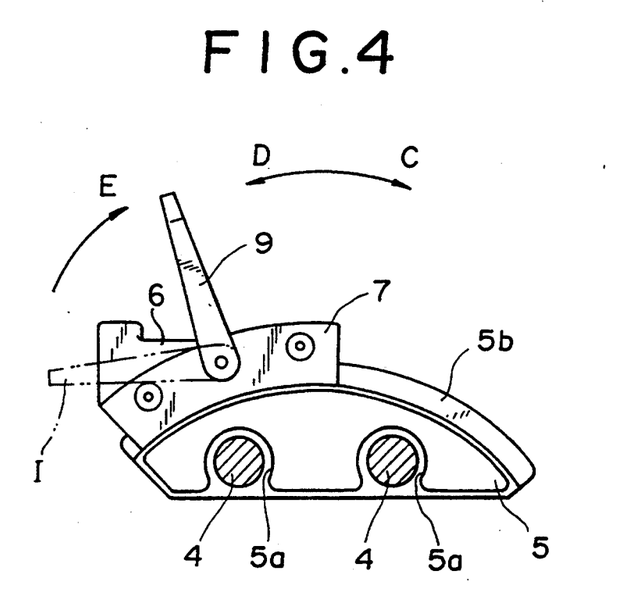
FIG. 4 is rear view as viewed in the direction IV—IV of FIG. 1.

In the operation of the desk-top slide circular saw, the thrust shafts 4 are slidingly moved to a predetermined position along the direction A or B in FIG. 1, and the cutter device 17 is supported by the bearings 3b. Subsequently, as shown in FIG. 3, the second holder 6 of the cutter device 17 is rotated in the direction C or D so that the circular saw blade 13 is set up at a desired angle. It is thus possible to adjust the cutting angle of a timber 18 to be cut. Furthermore, the lever 9 takes a lock release position indicated by two-dot and dash lines I in FIG. 4 where gaps are formed between any two of the first holder 5, the second holder 6 and the retainer block 7. At the position, I, the lever is not in a fastened condition and hence the second holder 6 is slidingly movable relative to the first holder 5. When the saw blade 13 has been set at the desired angle, the lever 9 is rotated in the direction E in FIG. 4, so that the lever shaft 8 mounted on the lever 9 is threadedly advanced whereby the first holder 5, the second holder 6 and the retainer block 7 are held under a fastened condition. Under this condition, the handle 16 is pushed downwardly, so that the gear case 10 is rotated about the shaft 11 and the circular saw blade 13 is also moved downwardly. Thus, it is possible to cut the timber 18 at the desired angle. When the operator's hand separates away from the handle 16, the circular saw blade 13 is returned back to the original position by the biasing force of the coil spring 15. Furthermore, the lever 9 moves back and forth together with the first holder 5 and the second holder 6 in the direction A or B in FIG. 1. As a result, it is easy to adjust the angle of the circular saw blade 13.

Incidentally, the circular saw blade 13 may be adjusted up to 45° on both sides of the vertical plane.

In the foregoing embodiment, the cross-sectional shape of the convex portion 5b is in the form of an inverted trapezoidal shape. The shape is not limited thereby or thereto but it is possible to take any other shapes such as a rectangular form.

In the first embodiment, the convex portion 5b is formed in the first holder 5, and the concave portion 6a is formed in the second holder 6. It is of course possible to take, a reverse arrangement in which the concave portion is formed in the first holder 5 and the convex portion is formed in the second holder 6.

Figure 5:
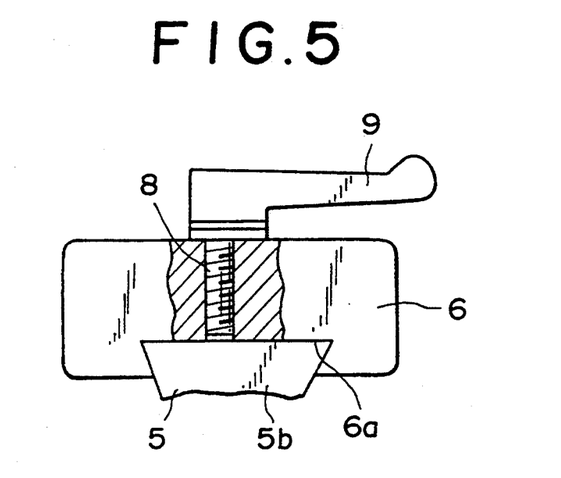
FIG. 5 is an enlarged view showing a fastening means of a desk-top slide type circular power saw in accordance with another embodiment of the invention.
Figure 6:
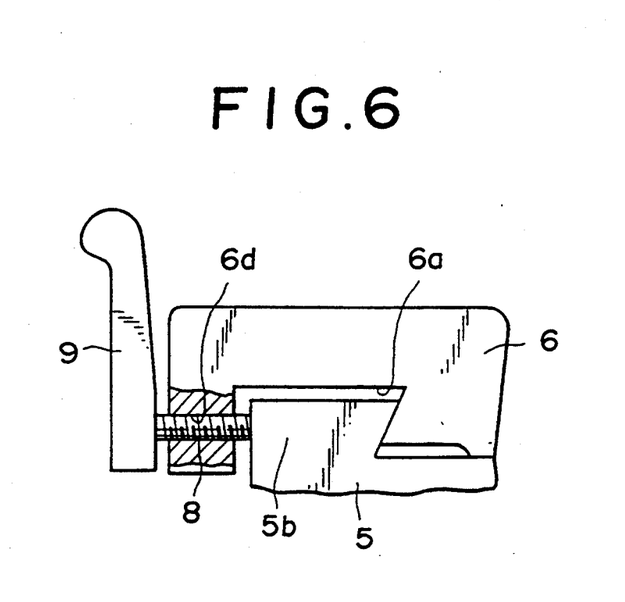
FIG. 6 is an enlarged view showing a fastening means of a desk-top slide type circular power saw in accordance with still another embodiment of the invention.
Figure 7:
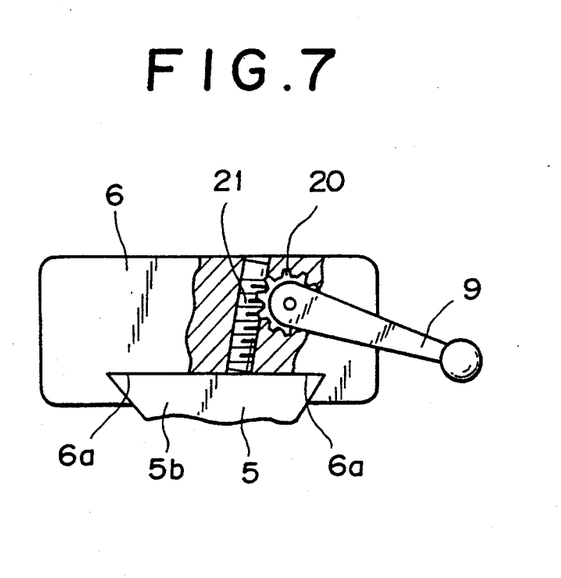
FIG. 7 is an enlarged view showing a fastening means of a desk-top slide type circular power saw in accordance with still another embodiment of the invention.

FIGS. 5 to 7 show other modifications of the coupling means for the first and second holders 5 and 6 of the desk-top top slide type circular power saw according to the invention.

In FIG. 5, a concave portion 6a engaged with a convex portion 5b of the first holder 5 is formed in the second holder 6, and the lever shaft 8 mounted on the lever 9 is provided in the vertical direction.

In FIG. 6, a concave portion 6a, engaged with a convex portion 5b of the first holder 5, is formed in the second holder 6, and a lever shaft 8 mounted on the lever 9 is passed through a hole 6d formed in the second holder 6 and engaged with a screw hole formed in the first holder 5.

In FIG. 7, a concave portion 6a engaged with a convex portion 5b of the first holder 5 is formed in the second holder 6. A pinion 20 is mounted on the lever 9. A screw 21 acts as a clamping member and is provided for engaging with the pinion 20 and is threadedly engaged with the pinion 20 and is engaged with the first holder 5.

Figure 8:
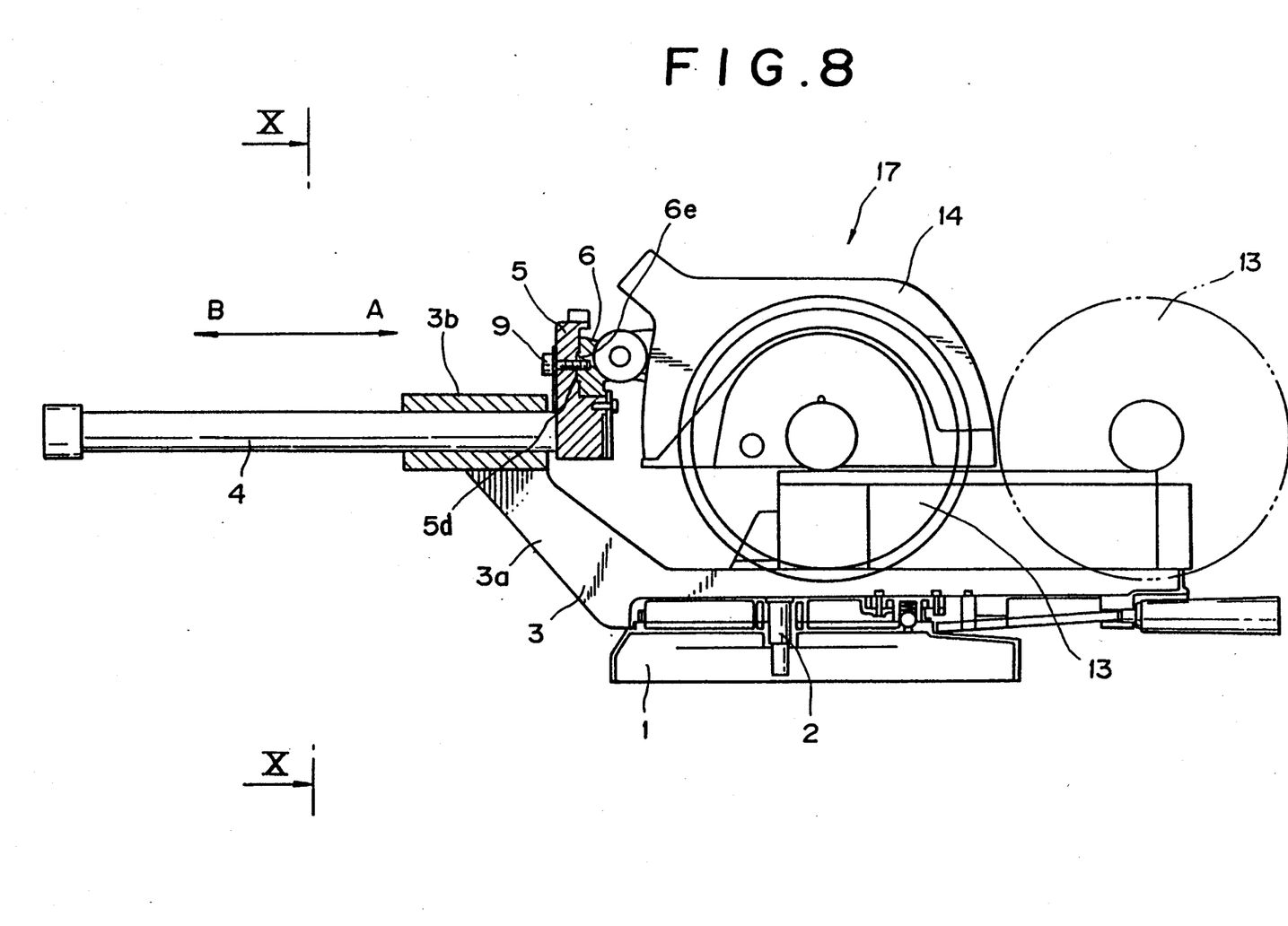
FIG. 8 is a side elevational view showing a desk-top slide type circular power saw in accordance with another embodiment of the invention.
Figure 9:
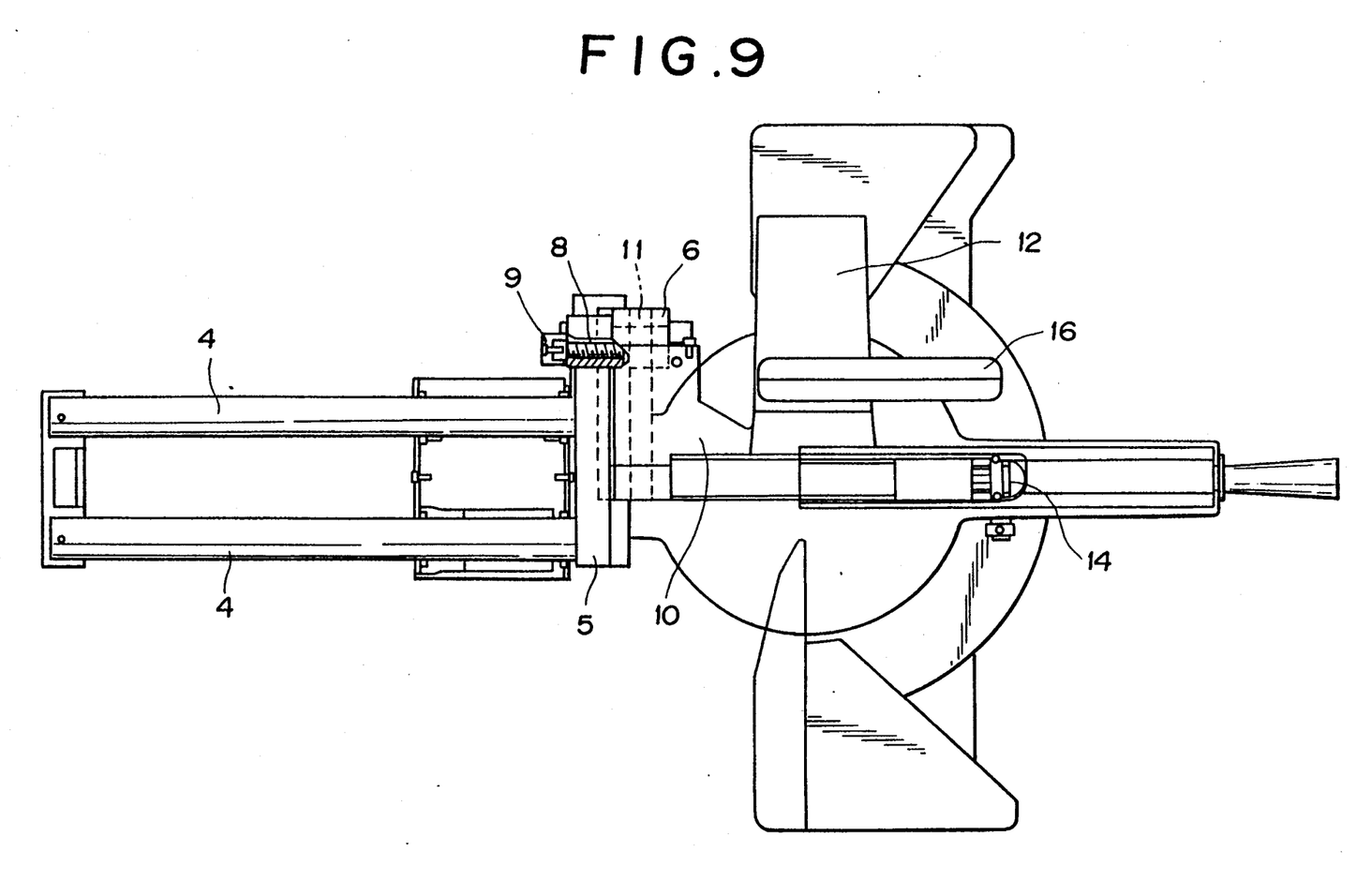
FIG. 9 is a top plan view showing the circular power saw shown in FIG. 8.

FIGS. 8 and 9 shows a desk-top slide type circular power saw in accordance with another embodiment of the invention, in which the same reference numerals are used to indicate the like components or members of FIGS. 1 and 2.

Figure 10:
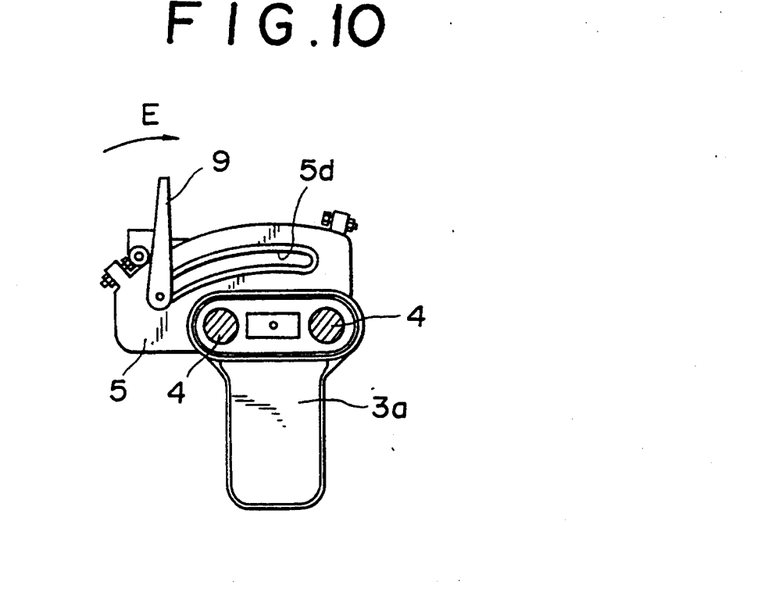
FIG. 10 is a view as viewed in the direction X—X of FIG. 8.

In this embodiment, an arcuate groove 5d is formed on a side wall, on the side of the base 1, of the first holder 5. A convex portion 6e of the second holder 6 is slidably engaged with the groove 5d. The first holder 5 and the second holder 6 are fixed to each other by the lever shaft 8 mounted on the lever 9. At this time, the lever shaft 8 is passed through a circumferential groove 5d formed in the first holder 5 (see FIG. 10).

The operation of this embodiment is substantially the same as that of the first embodiment.

The cutter device 17 is moved along the direction A or B in FIG. 8, and under the lock release condition of the lever 9, the second holder 6 is slidingly moved in the circumferential direction along the groove 5d of the first holder 5 to thereby slant the cutter device 17. Thus, the circular saw blade 13 is slanted relative to the timber to be cut. Then, under the lock condition of the lever 9, i.e., by rotating the lever 9 in the direction E of FIG. 10, the lever shaft 8 mounted on the lever threadedly advances to thereby couple the first holder 5 and the second holder 6 with each other.

As described above, according to the present invention, the bearing means is formed in unison with the turntable, thereby enhancing the mechanical strength. The number of the mechanical parts is reduced, resulting in keeping the cost down. Furthermore, since the first holder and the second holder are moved back and forth in the thrust axial direction together with the cutter device, it is possible to readily perform the slanting work of the cutter means in an effective manner.

What is claimed is:

1. A desk-top slide type circular power saw having a circular saw blade comprising:

cutter means capable of performing slant cutting and longitudinally movable back and forth;

a base;

a turntable rotatably mounted on said base, a workpiece being seated on a surface of said turntable for cutting;

bearing means formed in said turntable;

thrust shaft means supported by said bearing means, said thrust shaft means reciprocally movable back and forth in said longitudinal direction;

a first holder mounted on one end of said thrust shaft means;

a second holder slidable relative to said first holder, said cutter means being mounted on said second holder and pivotable relative to said second holder toward said turntable; and coupling means for coupling said first and second holders with each other; wherein:

the first holder comprises:

shaft attachment means for connecting the first holder to the thrust shaft means, and an annular portion attached to the shaft attachment means, a trapezoidal outer portion of the annular portion having a trapezoidal cross-section in the longitudinal direction of the thrust shaft means, a longer base of the trapezoidal outer portion defining an outermost bearing surface of the annular portion and two angularly opposing sides of the trapezoidal outer portion defining a pair of clamping surfaces;

the second holder comprises:

saw attachment means for attaching the cutter means to the second holder, and a bearing portion connected to the saw attachment means, the bearing portion having an inner surface mating with the trapezoidal outer portion, a first portion of the inner surface resting on the outermost bearing surface and a second portion of the inner surface tightly and releasably fitted against one of the pair of clamping surfaces in a clamped position; and the coupling means comprises:

a movable attachment means for releasably connecting the first holder to the second holder, and a clamping block tightly fitted against a second one of the pair of clamping surfaces; wherein:

when the attachment means moves towards the clamping block, the trapezoidal outer portion of the annular portion is tightly clamped between the clamping block and the second portion of the inner surface of the second holder along the pair of clamping surfaces, and when the attachment means moves away from the second holder, the clamping block is loosened and the coupling means and the second holder are freely movable in a circumferential direction of the annular portion.

2. The circular power saw according to claim 1, wherein said attachment means comprise a fastening screw and a lever fixed to said fastening screw.

3. The circular power saw according to claim 2, wherein said fastening screw extends through said clamping block and treadedly engages with said second holder.

4. A desk-top slide type circular power saw having a circular saw blade comprising:

cutter means capable of performing slant cutting and reciprocally movable in a longitudinal direction;

a base;

a turntable rotatably mounted on said base wherein a workpiece is supported by a surface of said turntable;

a pair of bearing means formed at an upper end of an arm of said turntable, said arm extending upwardly away from the turntable;

a pair of thrust shafts supported by the pair of bearing means, the pair of thrust shafts being reciprocally movable in said longitudinal direction;

a first holder provided at a first end of the pair of thrust shafts, said first holder having a first engagement portion which straddles the pair of thrust shafts, said first holder including an arcuate groove that extends along an arcuate path that includes a center at an intersecting point with the surface of the turntable on a line along the circular saw blade when said saw blade takes a position perpendicular to said turntable;

said arcuate groove extending transversely to said thrust shafts, and including a structure that spans and curves downwardly toward said thrust shafts;

a second holder provided with a second engagement portion that slidingly engages said first engagement portion, said cutter means being pivotably mounted on said second holder such that it is pivotable relative to said second holder toward said turntable; and coupling means, between said bearing means and said cutter means, for coupling said first and second holders with each other.

5. The circular power saw according to claim 4, wherein said coupling means includes a fastening screw and a lever fixed to said fastening screw.

6. The circular power saw according to claim 5, wherein said fastening screw extends through said first holder and threadably engages with said second holder.

7. The circular power saw according to claim 4, wherein said first and second engagement portions are formed as corresponding protruded and recessed portions.

8. The circular power saw according to claim 4, wherein the arcuate groove includes an asymmetrical orientation with respect to the pair of trust shafts.

9. A desk-top slide type circular power saw having a circular saw blade comprising:

cutter means, including said circular saw blade, capable of performing slant cutting and longitudinally movable back and forth;

a base;

a turntable rotatably mounted on said base;

bearing means formed in an arm that extends upwardly from a rear side of the turntable;

thrust shaft means supported by said bearing means, said thrust shaft means being reciprocally movable back and forth in parallel to an upper surface of the turntable;

shaft attachment means connected to a front end portion of the thrust shaft means on an end of said thrust shaft means closest to the turntable;

a first holder, formed as a single, integral piece with said shaft attachment means, having a first engagement portion that includes an arcuate slot having a radial center point located on the upper surface of the turntable;

a second holder having a second engagement portion slidably mounted against the first engagement portion, said cutter means being mounted on the second holder to be pivotable thereabout toward the turntable with the blade of the saw directed toward said radial center point regardless of the relative position of the first and second engagement portions; and coupling means for coupling said first and second holders with each other for selectively restricting the sliding motion between the first engagement portion of the first holder and the second engagement portion of the second holder.

10. The circular power saw according to claim 9, wherein said coupling means includes a fastening screw and a lever fixed to said fastening screw.

11. The circular power saw according to claim 9, wherein said first engagement portion is an annular member having an arcuate surface and said second engagement portion has a shape corresponding to the arcuate surface of said first engagement portion, wherein said first and second engagement portions are formed as corresponding protruded and recessed portions.

12. The circular power saw according to claim 9, wherein a first line tangent to an uppermost portion of said arcuate slot and an axis about which said cutting means is pivotably mounted to move toward said turntable together define a first plane that is substantially parallel to a second plane defined by the surface of the turntable.

13. The circular power saw according to claim 9, wherein the coupling means is positioned above an axis of rotation of said circular saw blade when the cutter means is in a lower cutting position.

* * * * *